United States Patent [19]

Wang et al.

[11] Patent Number: 5,852,731

[45] Date of Patent: Dec. 22, 1998

[54] COMPUTER PROGRAM PRODUCT FOR SYNCHRONIZING STATIC VARIABLE INITIALIZATION AND REFERENCE UNDER A MULTI-THREADED COMPUTER ENVIRONMENT

[75] Inventors: I-Shin Andy Wang, San Jose; Roni Korenshtein, Los Gatos, both of Calif.

[73] Assignee: International Business Machines Corporation, Armonk, N.Y.

[21] Appl. No.: 940,205

[22] Filed: Sep. 29, 1997

Related U.S. Application Data

[63] Continuation of Ser. No. 465,240, Jun. 5, 1995, abandoned.
[51] Int. Cl.$^6$ ....................................................... G06F 9/40
[52] U.S. Cl. ........................... 395/670; 395/676; 395/672
[58] Field of Search .................................. 395/672, 673, 395/676, 677, 670

[56] References Cited

U.S. PATENT DOCUMENTS

| | | | |
|---|---|---|---|
| 5,404,521 | 4/1995 | Murray | 395/650 |
| 5,421,013 | 5/1995 | Smith | 395/650 |

OTHER PUBLICATIONS

"The O Programming Language" by Brain W. Kernighan Prentice Hall, 1988.

"Programming under Mach" by Joseph Boykin, Addison –Wesley Publishing Company 1993.

"Advanced Windows NT", Jeffrey Richter, Microsoft Press, 1993.

*Primary Examiner*—Alvin E. Oberley
*Assistant Examiner*—Sue Lao
*Attorney, Agent, or Firm*—Prentiss W. Johnson; Sterne, Kessler, Goldstein & Fox PLLC

[57] ABSTRACT

The present invention is a computer program product to avoid static variable initialization and reference conflicts in a multi-threaded computer system. There are four major problems that arise with computer programs containing static variable references and static variable initializations on a computer system with a multi-threaded operating system: (1) premature references made on an uninitialized static variable; (2) side effects caused by initialization competition among threads; (3) multiple initialization of the same static variable; and (4) server control of static variable reference and initialization. Each of these four problems is eliminated by the system and method of this invention. The invention operates by locking the CPU during identification of the first thread seeking to initiate a static variable operation, maintaining all other threads in a wait state, and unlocking the CPU thus releasing the waiting threads from their wait state. Another component of the invention provides an additional control mechanism to invoke the disclosed static variable controller to eliminate potential static variable conflicts among competing threads.

6 Claims, 8 Drawing Sheets

COMPUTER PROGRAM PRODUCT FOR SYNCHRONIZING STATIC VARIABLE INITIALIZATION AND REFERENCE UNDER A MULTI-THREADED COMPUTER ENVIRONMENT

This application is a continuation application Ser. No. 08/465,420, filed Jun. 5, 1995, now abandoned.

CROSS-REFERENCE TO RELATED APPLICATION

The following is a related, commonly owned, co-pending application:

*System and Method for Synchronizing Static Variable Initialization and Reference Under a Multi-Threaded Computer Environment*, U.S. patent application Ser. No. 08/911,184

TECHNICAL FIELD

The present invention relates in general to a computer program product to avoid static variable initialization and reference conflicts in a multi-threaded computer system.

BACKGROUND ART

Multi-threaded computer systems are computers with operating systems that allow a machine's resources (for example, central processing unit (CPU), input/output interface, memory, and peripherals) to be used by multiple instruction streams (threads) in parallel. In a multi-threaded computer environment, the operating system allocates CPU processing among competing threads in a round robin fashion enabling parallel processing of instruction streams. When instruction streams are executing independent processes, multi-threaded environments are an efficient means to maximize use of CPU resources. However, in many cases instruction streams will have interdependencies created by references to certain types of variables in a computer program. With multiple threads being processed in parallel, competition and conflict among the threads can occur when multiple threads attempt simultaneous reference or initialization of certain variables.

Static variables are variables declared in a computer program that have static storage duration. Once declared, computer memory for a static variable remains allocated until the termination of the program. All references to a static variable from any portion or subroutine of a computer program refer to the memory location that was allocated for that variable. Multiple copies of the contents of the static variable memory location are not created as they might be for non-static variables. The value stored in the memory location corresponding to a static variable will always contain the last value written to this location throughout program execution.

There are four major problems that arise when computer programs containing static variable references and static variable initialization on a computer system with a multi-threaded operating system: (1) premature references made on an uninitialized static variable; (2) side effects caused by initialization competition among threads; (3) multiple initialization of the same static variable; and (4) server control of static variable reference and initialization. Each of these four problems that exist in the art are outlined briefly below.

Since the values of static variables persist across references to the static variable, static variables are shared by threads which have access to them. Without initialization and reference synchronization among the threads, it is likely that some threads can access uninitialized static variables. A premature attempt to access a static variable can cause serious program errors during run-time. For instance, if the first thread executes the initialization of static variable A, and before the initialization is complete, control of the CPU is given to the second thread, this second thread can try to reference static variable A. Since the initialization of A has not been completed by the first thread, a run-time error can occur.

Potentially multiple threads are competing for the ability to initialize a static variable. If the sequence in which a thread gains control of the CPU does not correspond with the initialization intended by the program logic, it is possible to have an out-of-sequence initialization. For example, initializing the first static variable in a function can require an operation that opens a file, and initializing the second static variable can require an operation that writes to a record in the file with the assumption the file has been opened by the initialization of the first variable. A situation can occur where the first thread is initializing the first static variable when the second thread starts initializing the second static variable. The second thread can try to write the record to the file before the file was opened. This can also cause a run-time error.

Since multi-threading is controlled by the operating system, conventional multi-threaded computer systems rely upon the compiler to generate code that guarantees that a static variable will be initialized only once. However, conventional systems are limited in that they can only satisfy this guarantee for single-threaded applications. When executing multi-threaded applications compiled by existing compilers on these systems, it is possible that while executing a multi-threaded application, two or more threads can execute the initialization of the same static variable. As discussed previously, the consequence of two or more threads attempting to execute an initialization of the same static variable can be a run-time error.

It is difficult to implement server level mechanism to control static variable references. The server not only has to be able to know which client thread is invoking the server's static variable control, but the server also must synchronize communication among the threads at the same time that it is performing static variable control. Because of the coding difficulties, the responsibility of static variable control is commonly moved into the client code. A client is a computer system that uses the instruction processing resources of another computer, either directly attached to the client or connected to the client through a computer network. Programs that rely on code running on the client to control static variables is generally considered ill-designed and has proven to be difficult to maintain and debug. Additionally, this kind of client-driven static variable control will not work in situations where the application requires static variable control by the server.

The present invention provides a solution for each of the four difficulties discussed above that are not adequately addressed by the conventional art. Prior to the reduction of this invention to practice, there was no current compiler design and implementation for generating guarded executable code to protect static variables from competing initialization and reference. Without such protection, serious run-time errors will result that are extremely hard for the users to debug, since these errors are caused by the compiler, not the user's code.

DISCLOSURE OF INVENTION

The present invention is a computer program product for the control of static variable initialization and references (SVIR) in a multi-threaded computer environment. This invention was designed to eliminate the potential sources of unreliability identified above in the Background Art section that result from competing threads running a multi-threaded application with static variable control.

A significant problem in the art solved by this invention is best illustrated by the following example. Table 1 contains a partial listing of machine code corresponding to a C/C++ function involving a static variable initialization. The code in Table 1 is the machine code that would be generated by the Borland C/C++ compiler for the OS/2™ operating system.

TABLE 1

Assembly code for static variable initialization generated by the Borland C++ compiler.

| Code | | | Statement |
|---|---|---|---|
| CMP | byte ptr $eijmlgaa, 0 | | ------ A |
| JNE | short @66 | | ------ B |
| INC | byte ptr $eijmlgaa | | ------ C |
| ; static initialization placed here | | | |
| $eijmlgaa | label | byte | |
| | db | 0 | |

Conventional compilers, such as the Borland C/C++ compiler used in this illustration, assure the user that a static variable will be initialized only once. Conventional compilers try to satisfy this guarantee by creating a flag for each static variable and initializing this flag to zero. The first time the function is called, the flag is checked and since its value is zero, the static variable is initialized. After this static variable initialization, the flag value is changed to contain a non-zero value. This will prohibit multiple static variable initialization in a single threaded application. In a multi-threaded application, the static variable can be initialized more than once in the following case. If the first thread is forced to relinquish control of the machine resources by the operating system while this thread is still executing statement A, B, or C; another thread can have a chance to execute these statements. As a result, the static variable initialization can be performed twice. The present invention provides a means to eliminate this problem.

The present invention has two interrelated components that, when combined, solve the four classes of problems previously identified as being caused by SVIR instructions in a multi-thread environment. The first component of the invention is to provide a mechanism to assign a unique label to the first thread in a process desiring to perform a static variable reference or initialization. The second aspect of the invention is to provide the mechanism to execute static variable initialization or references using the guaranteed unique labeling of the first thread.

The present invention has several applications and advantages. Application of this invention includes, but is not limited to, computer compiler design and implementation for SVIR instructions under a multi-threaded environment and application software development requiring an SVIR synchronization technique that is user friendly and easy to maintain. Software developers can use this technique to improve the quality of legacy code, and code under development, involving SVIR instructions. This invention has an object-oriented architecture. The static data is located on a client machine and the SVIR operations are on a server machine. The maintainability of this code derives from this feature. Those skilled in the art will recognize that there are other uses of this invention that are consistent with the scope and the spirit of the claims and the teaching of the specification.

An advantage of the present invention is that it identifies the potential multiple initialization of static variables and provides an efficient control means for both compiler designers and developers of multi-threaded application programs. Another advantage of the present invention is that it provides user-friendly SVIR control with a concise application programming interface and flexible configuration options that can be applied to a block of code containing SVIR instructions. Further, in contrast to conventional client-driven solutions to SVIR execution conflicts, the preferred embodiment of this invention adopts a server-driven solution. Still another advantage of the present invention is that it only requires that a single thread enter the critical section of the program; therefore, the other threads will not waste machine resources. Yet another benefit of the present invention is that it does not require the compiler to change the design, implementation, or assumptions made regarding static initialization.

The foregoing and other objects, features and advantages of the invention will be apparent from the following more particular description of a preferred embodiments of the invention, as illustrated in the accompanying drawings.

BEST MODE FOR CARRYING OUT THE INVENTION 1.0 Introduction

Figure 1:
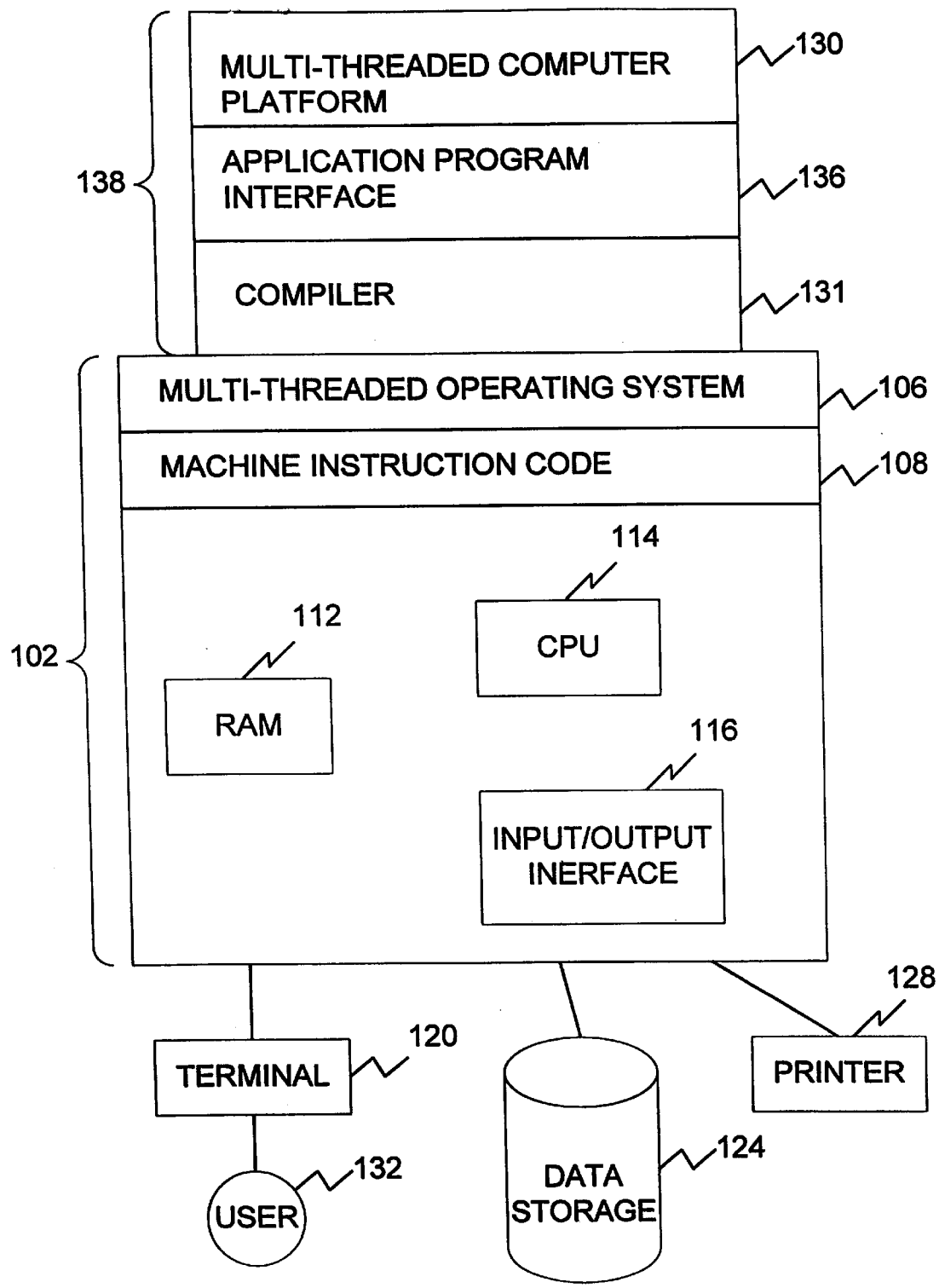
FIG. 1 is a schematic illustration of a multi-threaded computer platform in which the present invention can be advantageously employed.

The method of the present system is intended for use on a multi-threaded computer platform. An example of a computer system environment depicting a hardware implementation of the present invention is shown in FIG. 1. The computer system environment comprises a computer controller 138, which operates on a computer platform 102. The computer controller 138 includes one or more multi-threaded application program(s) 130, an application programming interface (API) 136, and a compiler 131, for example.

The computer platform 102 includes hardware unit 110 having a central processing unit (CPU) 114, a random access memory (RAM) 112, and an input/output interface 116. The RAM 112 is also called a main memory.

The computer platform 102 also includes machine instruction code (also called assembly code) 108, and a multi-threaded operating system 106. Various peripheral components can be connected to the computer platform 102, such as a terminal 120, a data storage device 124, and a printing device (printer) 128. The data storage device, or secondary storage, 124 can include hard disks, tape drives, or the like. The data storage device 124 represents non-volatile storage. The operating system supports multi-threaded operation.

User(s) 132 interact with the computer platform 102 and the computer controller 138 via terminal 120.

In a preferred embodiment of the present invention, the computer platform 102 includes a computer having an IBM PC architecture. The operating system 106, which runs thereon, is the IBM OS/2 operating system. Also, the computer controller 138 includes a C/C++ programming language compiler with an API, both designed for the IBM OS/2 operating system.

In such a multi-threaded computer environment, computer resources are allocated among several instruction streams, or threads. Under OS/2, a thread is the smallest unit of execution that an operating system can schedule. A multi-tasking operating system enables the scheduling of multiple threads for execution, and negotiates the time division of computer resources, such as the CPU, input/output controller, and memory, among competing threads. Each thread can be allocated a number of CPU cycles by the operating system for processing of each stream's instructions.

Each thread has allocated to it a block of memory locations in RAM. In a thread's memory block consists of an instruction stack, an instruction pointer that indicates the last instruction executed on behalf of the thread, the CPU state as it existed when this thread relinquished control, and a priority stamp. For each thread, there is an entry in the operating system's scheduler list. A thread can exist in one of three states: It can be blocked while waiting on some event, it can be scheduled to execute, or it can be executing. The execution of one instruction of application program code can require the execution of several machine instructions. When several threads are being allocated a fixed number of machine cycles by the operating system, it is possible that a thread will not complete the execution of an application program instruction before it must surrender control of the machine resources to another thread. Synchronization among the several threads running in a multi-threaded environment is a critical component for application programs that have been written to include multi-threaded processes with static variable references or initialization. Without synchronization problems such as those identified in the Background Art section will occur.

Figure 2:
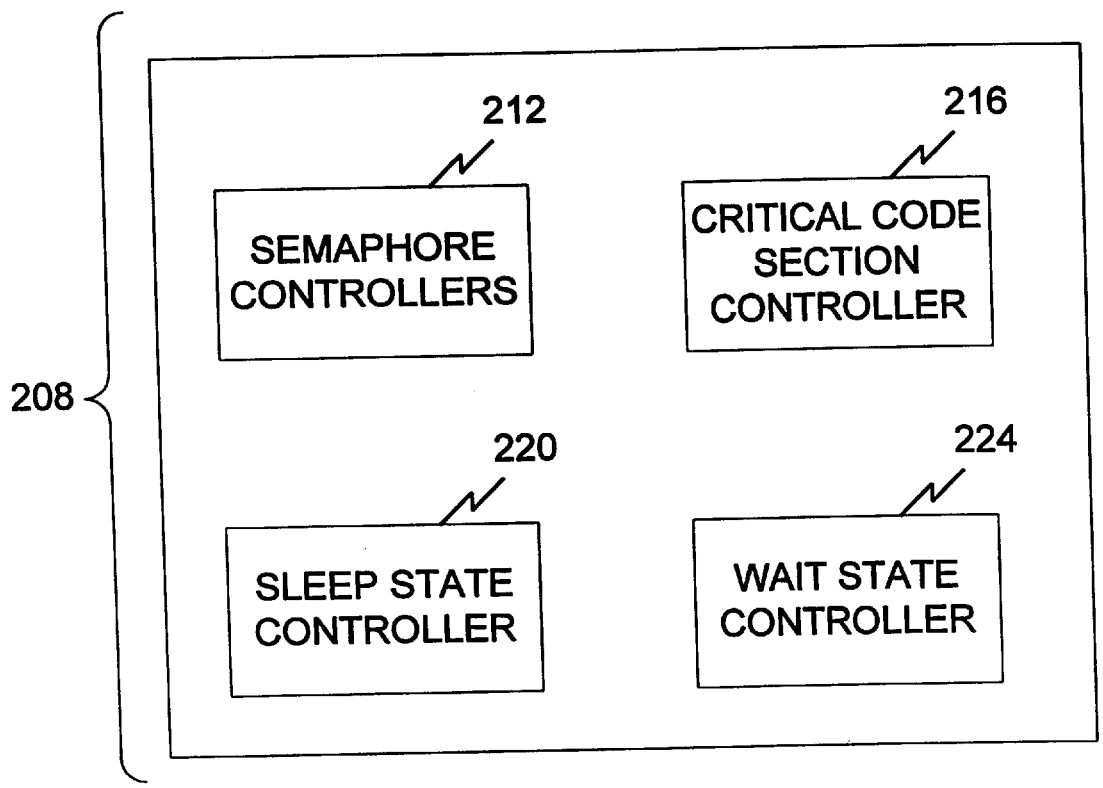
FIG. 2 illustrates the features of a multi-threaded operating system used in the preferred embodiment of the present invention.

FIG. 2 shows several operating system resources 208 used in connection with the preferred embodiment of the present invention. Among these operating system features are, semaphore controllers 212, critical code section controllers 216, a sleep state controller 220, and a wait state controller 224. In the preferred embodiment, OS/2 operating system resources will be used by the present invention. However, it would be apparent to a person skilled in the relevant art that operating systems other than OS/2 will also have similar functions. In addition, the skilled artisan would be able to provide these features through modifications or combinations of existing operating system features without deviating from the scope of the present invention, as long as the functions set forth below are present.

A semaphore is an operating system managed software flag used to coordinate the actions of concurrent threads and processes. An operating system shall first have the ability to create a semaphore. During such creation the operating system allocates memory in RAM, initializes the memory location, and returns the address (handle) of the memory location associated with the semaphore. In addition, the operating system must have a control means, such as semaphore controllers 212, to change the state of a semaphore to indicate to the threads the occurrence of an event.

In the preferred embodiment, OS/2 semaphores are used for inter-thread communication through the operating system. The OS/2 API commands DosCreateEventSem, DosPostEventSem, and DosWaitEventSem are used in the present invention for the requisite semaphore control. The DosCreateEventSem API command creates a semaphore, initializes the semaphore, and returns a handle for that semaphore. The DosPostEventSem API command is used to change the state of a semaphore. The DosWaitEventSem API command is used to block execution on behalf of a thread until the semaphore state changes or until a time-out occurs. In the present invention the semaphore is used to indicate which thread has control. Control of the semaphore indicates which thread has exclusive control of machine resources. Before resuming execution, all threads without control of the semaphore must wait until control of the semaphore is relinquished.

Critical section delimiters are used in application program code to establish boundaries around sections of code where the instructions require exclusive access to machine resources. When the operating system critical code section controller 216 are invoked by critical section delimiters in the code, the CPU is locked into a mode for single-threaded operation. The present invention uses the API command DosEnterCritSec to cause the operating system to suspend program execution on behalf of all threads in the current process except for the thread that issued the call. The API command DosExitCritSec is issued at the completion of a critical section of code to terminate single threaded operation.

A sleep state, controlled by the operating system sleep state controller 220, is used by the present invention. During this sleep state, instruction execution on behalf of a designated thread is suspended for a specified period of time. In the OS/2 operating system the DosSleep API command is used to provide the required sleep state.

The present invention has two interrelated components. The first component of the invention is to provide a mechanism to assign a unique label to the first thread in a process desiring to perform a static variable reference or initialization. The second aspect of the invention is to provide the mechanism to control the execution of SVIR execution using the guaranteed unique labeling of the first thread. The remaining detailed description of the invention will be divided into two sections following this distinction.

2.0 Labeling of a First Thread Requesting Execution of Static Variable Initialization or Reference Instruction The method in the present invention of assigning a unique label to the first thread reaching a computer program instruction involving a static variable initialization or reference (SVIR) has three general components: (1) locking the CPU to prohibit competition among threads while the first thread label is assigned; (2) sending all threads that are not the first thread into a wait state while the first thread performs an SVIR operation; and (3) unlocking the CPU and releasing the threads that were in a wait state when the first thread has completed SVIR operations.

Figure 3:
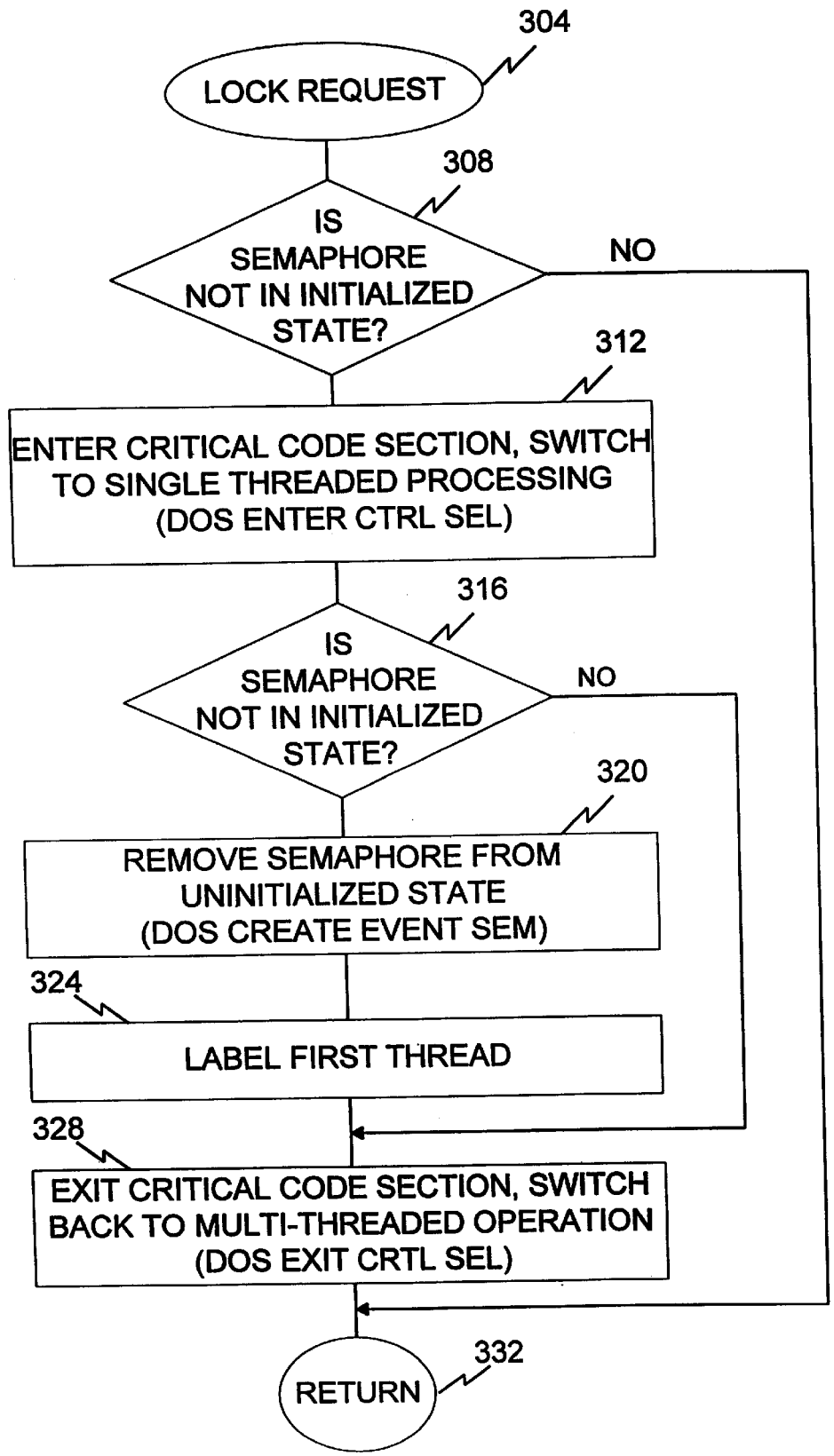
FIG. 3 is a flow chart showing the steps of a locking operation initiated by a locking request, according to the present invention.

FIG. 3 illustrates the present invention's handling of a lock request. Upon receipt of a lock request step 304 from the application program for a static variable initialization/reference (SVIR) lock, the locking means must first determine which of the threads requested the locking operation. Only if the thread requesting the locking operation is the first thread to request a lock in order to perform an SVIR operation, will the operating system honor the request. In order to establish and verify the identity of the first thread for reliable labeling of this thread, in the preferred embodiment a semaphore will be used to ensure that the first thread label is assigned uniquely.

When a first lock request is received a semaphore is checked at a step 308 to determine whether value of the memory location pointed to by the semaphore is in an initialized state (this state is user definable). If the memory location pointed to by the semaphore is in this initialized state, then the operating system is switched into a mode for single threaded processing of critical code at a step 312. Otherwise, the thread returns to the execution of SVIR instructions at a step 332.

To illustrate where this multiple initialization of a semaphore might occur, consider the following scenario. During the period after declaration of the semaphore and the setting of the semaphore, the value stored in the memory location pointed to by that semaphore is in an uninitialized state. In the OS/2 operating system the value of this uninitialized state will be equal to zero. When a DosCreateEventSem command is issued, the value stored in this memory location will no longer be equal to zero. When multiple threads reach the first test of the value of the semaphore 308, it is possible that if a first thread has not yet been identified, several threads can pass this test. Threads passing inquiry 308 are only presumed to be the first thread. After a thread triggers the DosEnterCrtlSec command, the threads that were not filtered out by the first semaphore check will proceed; however, these threads will only progress through the delimited critical section, one thread at a time. Of the threads that passed the first semaphore check 308, only one will be the first to acquire critical section control of the CPU, as represented by a step 312. The first thread to acquire critical path control of the CPU will reach a second semaphore test 316 first. At this point, the semaphore will still be in the uninitialized state; therefore, this first thread will go on to remove the semaphore from its uninitial state by issuing a DosCreateEventSem command at a step 320. Subsequently, this thread is guaranteed to be the first thread, and is so labeled at a step 324. The first thread then exits the critical control section of instruction execution at a step 328 and returns at a step 332 to the execution of SVIR instructions.

Other threads that were presumed to be first threads because they satisfied the first semaphore check 308, will each enter the critical section 312 one thread at a time. At this time, the semaphore will have been removed from its uninitialized state by the true first thread and when the subsequent presumed first threads reach the second semaphore check 316, the value of the semaphore will be nonzero, so these threads will not reinitialize the semaphore, nor will they be labeled as the first thread. If the second semaphore test 316 was eliminated, each of the subsequent presumptive first threads would execute a semaphore initialization and would also be labeled the first thread.

Figure 4:
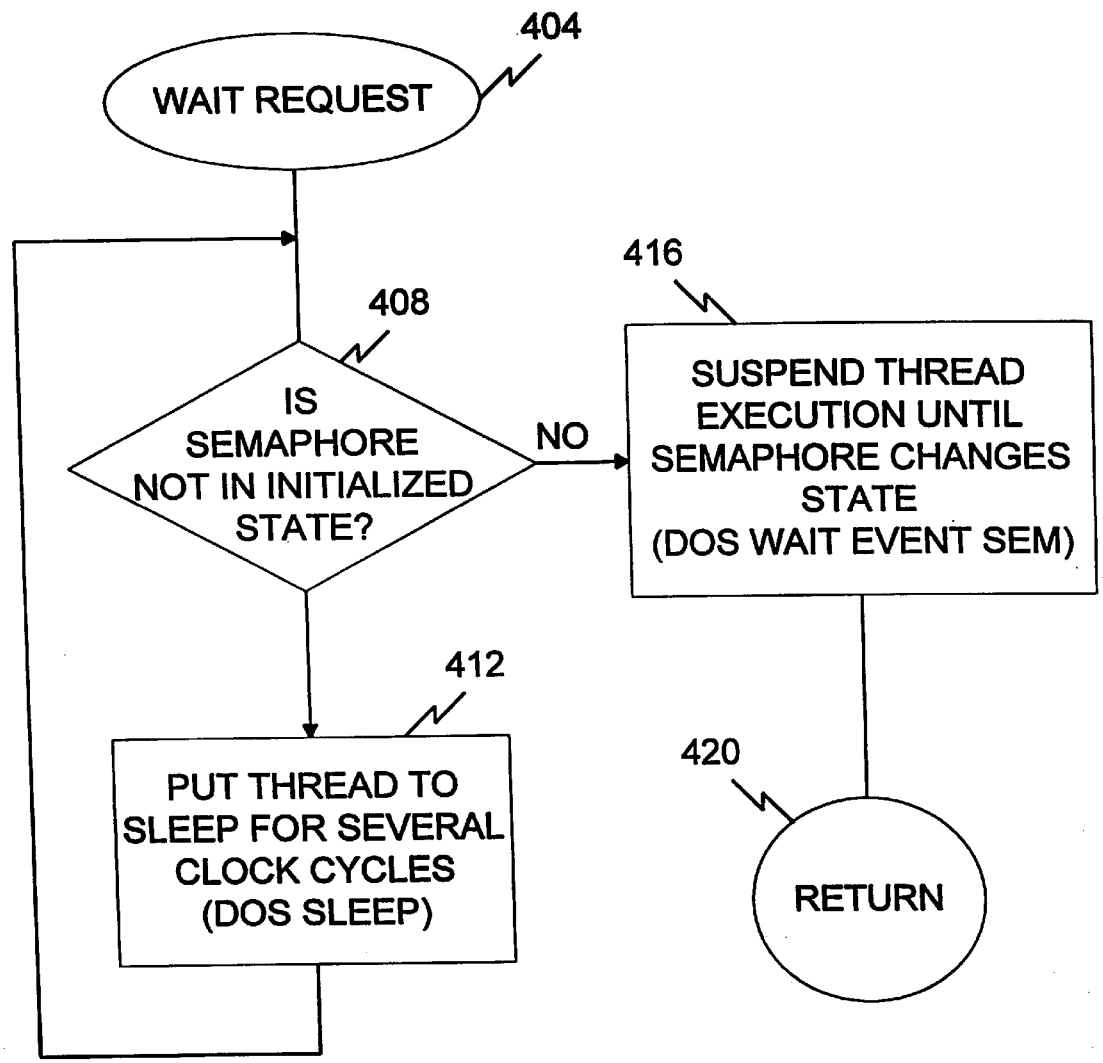
FIG. 4 is a flow chart showing the steps of a waiting operation initiated by a waiting request, according to the present invention.

When the first thread has gained exclusive control of the CPU as a result of the lock operation, the controller will send each of the remaining threads into a wait state, shown in FIG. 4, by issuing a wait request 404. These threads will remain in a wait state until the first thread has completed the SVIR instructions, and the CPU is unlocked and made available for multi-threaded operation. A person skilled in the relevant art will recognize that there are several alternative embodiments of a wait state. In the preferred embodiment, each thread that has been directed to enter a wait state, will read the value of the memory location pointed to by the semaphore at a step 408. In most cases, by the time a thread enters the wait state the semaphore will have been set to a non-zero value by the first thread during locking. However, in some cases, a thread entering the wait state could reach this state before the first thread has changed the value of the memory location pointed to by the semaphore. If this semaphore is in its uninitialized state, the thread will enter a sleep state for fixed number of clock cycles at a step 412. A person skilled in the relevant art will recognize that there are other options available for the embodiment of this wait state, such as sending the waiting thread into a conditional busy loop. In the preferred embodiment, while waiting for the semaphore memory location to change state, the thread will enter a state where its share of machine resources will be surrendered during this sleep period (not shown).

Once the waiting thread has detected that the value of the memory location pointed to by the semaphore has been changed from its uninitialized value of zero to a non-zero value (as indicated by the "No" result of step 408), the waiting thread will cease execution until receipt of notification from the operating system that an unlocking semaphore event has been initiated at a step 416. Each thread entering the wait state will follow the wait steps identified above, resulting in all of the threads that are not the designated first thread being suspended in a wait state, until the first thread executes an unlocking semaphore event. At this point the threads will return to program execution at a step 420.

Figure 5:
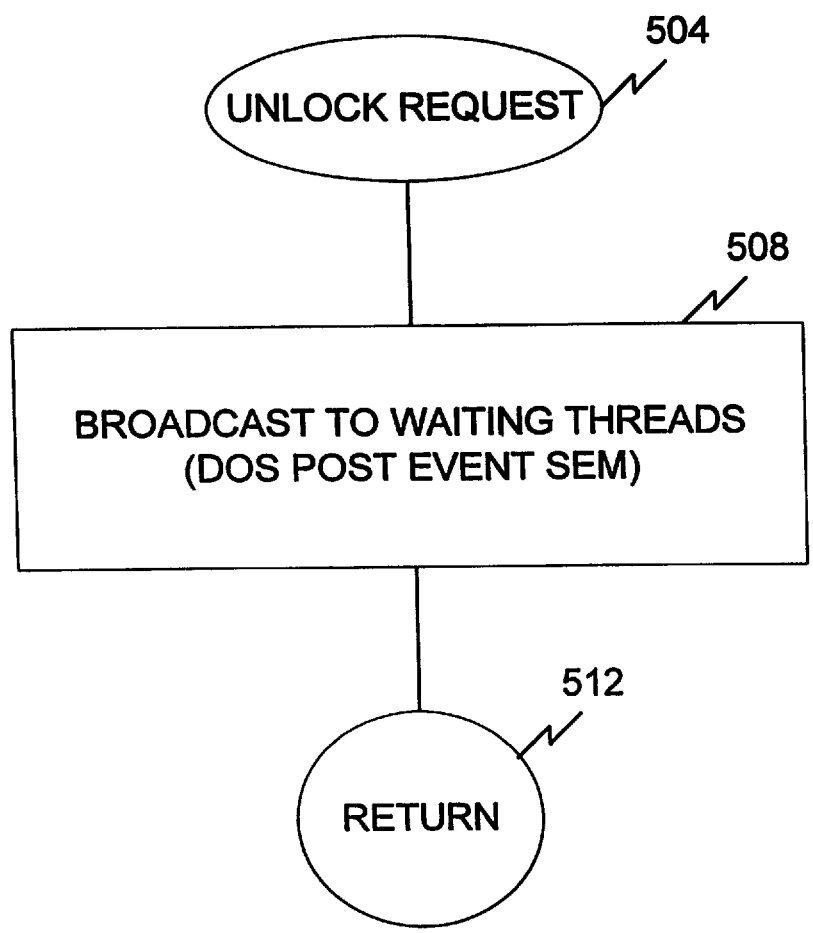
FIG. 5 is a flow chart showing the steps of an unlocking operation initiated by an unlocking request, according to the present invention.

FIG. 5 illustrates the present invention's handling of an unlock request. Each of the threads that are not the first thread will remain in a wait state until the first thread has completed the execution of the SVIR instructions delimited by a lock request and an unlock request, shown at a step 504. The fact that all threads, other than the first thread, are in the wait state while the first thread has exclusive single threaded control of the CPU guarantees that there will not be any SVIR conflict. The execution of an unlock request, shown at step 504, by the first thread will initiate the unlock semaphore event at a step 508. The execution of the unlock semaphore event 508 will cause the operating system to broadcast the occurrence of this event to the threads waiting for this indication in the wait state. The receipt of this notification will cause the waiting threads to be released from the wait state (not shown). The processor then returns at a step 512 to multi-threaded processing of instructions.

Figure 6:
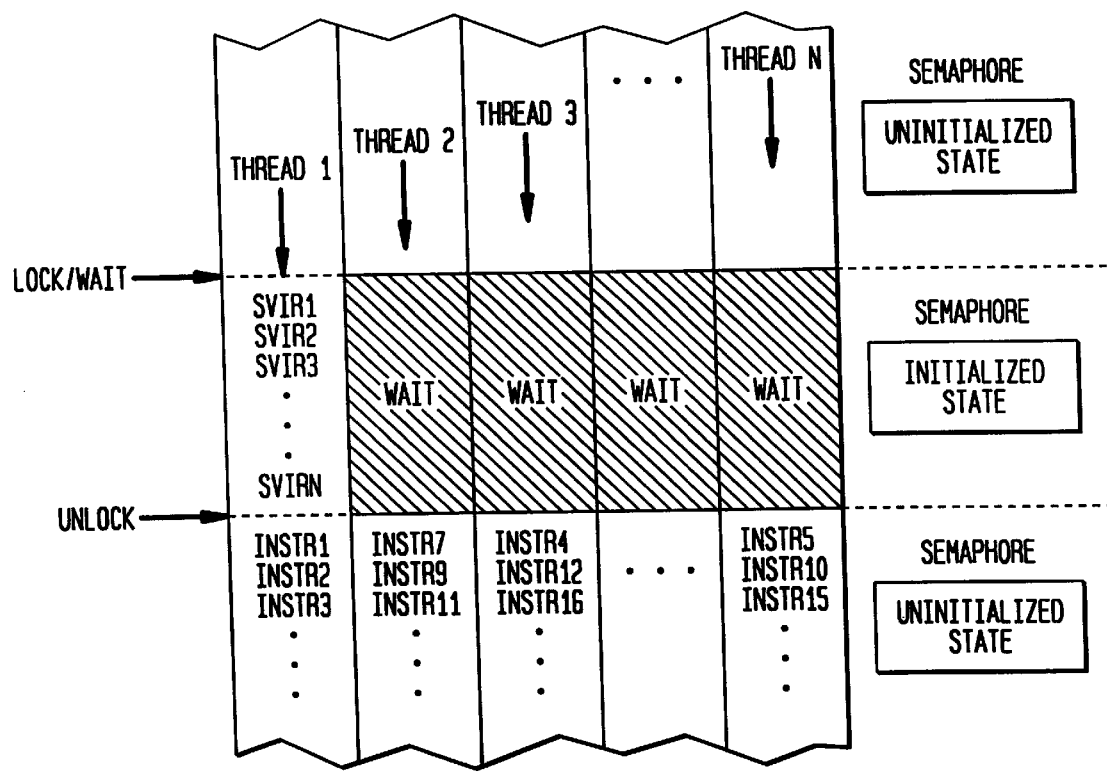
FIG. 6 is a conceptual illustration of the interrelationship among thread activity, thread control operations, and semaphore state, according to the present invention.

FIG. 6 is a conceptual illustration of the inter-relationship among thread activity, thread control operations, and semaphore state. This figure shows multiple threads executing program instructions in a multi-threaded computer system. Immediately prior to executing the first thread reaching the first SVIR operation, the semaphore is in an uninitialized state, and each of the threads is actively processing program instructions. After the first thread locks the CPU, the first thread executes SVIR instructions while the other threads are locked into a wait state. During this stage, the semaphore is in an initialized state. When the first thread unlocks the CPU, all threads return to processing program instructions. The semaphore returns to its uninitialized state.

3.0 Static Variable Initialization and Reference Instruction Execution Control

Figure 7:
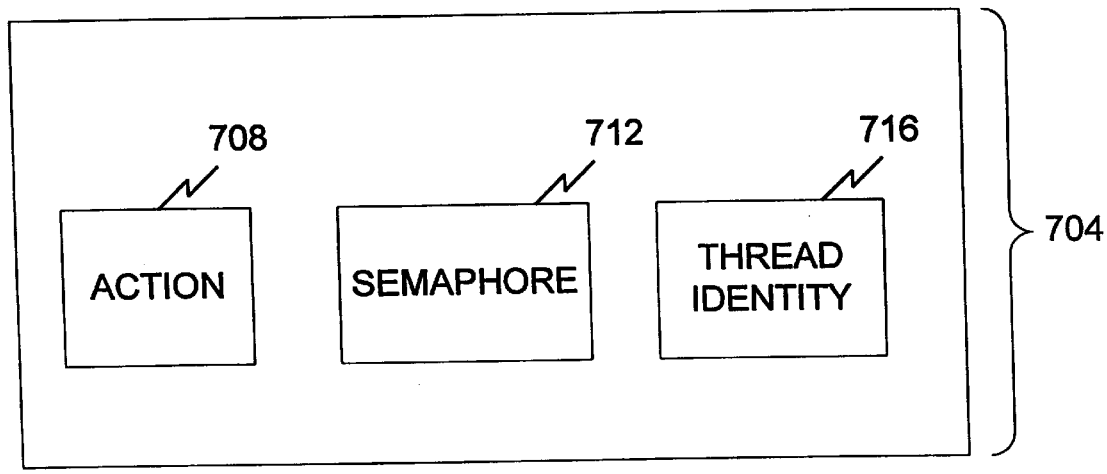
FIG. 7 is schematic illustration of the static variable initialization and reference execution controller of the present invention.

The previous section described a control means for locking the CPU, a means for maintaining threads in a wait state, and a means for unlocking the CPU. The second component of the invention (FIG. 7) provides an additional control means 704 to invoke the aforementioned control means to eliminate potential SVIR conflicts among competing threads.

The preferred embodiment of the SVIR execution control means component of the present invention is a single controller with three parameters. A first is an action parameter 708, which is used to select from among three different modes of operation: (1) lock; (2) wait; and (3) unlock. Each of these modes of operation relies on the locking, waiting, and unlocking control means provided by the labeling component of the invention described above.

Only the first thread will be able to initiate a locking or unlocking operation of the action parameter 708. All other threads activating this action parameter 708 will be forced to enter a wait state until the first thread has invoked an unlocking operation through this control means.

A second semaphore parameter 712 of the SVIR execution control means 704 contains a pointer to the semaphore being used for communication among the threads. This semaphore enables the inter-thread communication described in the previous sections. The semaphore will indicate which thread has control of the CPU. The semaphore is also used to indicate to threads that are in the wait state when the CPU has been unlocked.

A third parameter 716 of the SVIR execution control means 704 contains the identity of the thread invoking this control means. Each thread has one of two possible identities. A thread is either the first thread or it is not the first thread. As indicated, only the first thread can initiate a locking or unlocking action. Threads that are not the first thread can only initiate a wait action.

Figure 8:
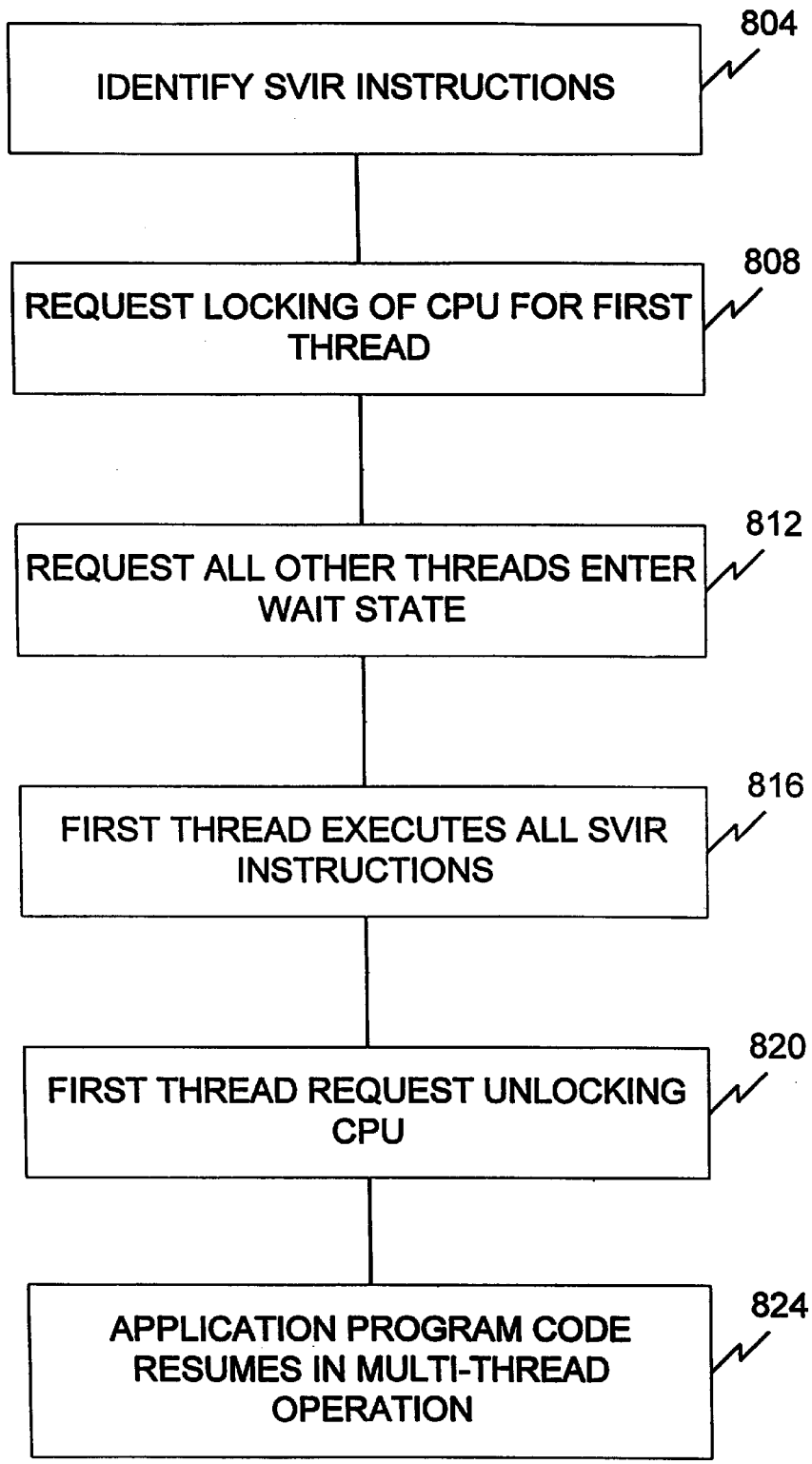
FIG. 8 is a flow chart showing the steps of static variable initialization and reference instruction execution.

FIG. 8 illustrated the methodology of the control means of the present invention. First, processes in multi-threaded application code that contain SVIR instructions are identified at a step 804. Immediately before the first SVIR instruction, the SVIR execution control means 704 is used to invoke a lock operation at a step 808 immediately followed by a wait operation at a step 812. Immediately following the final SVIR instruction 816, the SVIR execution control means 704 shall be used to invoke an unlocking operation at a step 820. Following this unlocking instruction 820, execution of the remaining application program code at a step 824 will resume with the CPU returning to a multi-threaded operation mode.

In the preferred embodiment two initializations must occur before the SVIR execution control means 704 is invoked. The state of the first thread label must be initialized. In the preferred embodiment this corresponds to setting the first flag label equal to zero. In addition, memory in RAM must be reserved for the semaphore. The preferred embodiment exploits a feature of the C/C++ programming language that causes the value of the pointer indicating the memory location of the semaphore to equal zero. Table 2 provides an illustration of the usage of the SVIR execution control means 704. Table 3 provides an example of a C++ language implementation of the illustration presented in table 2.

TABLE 2

Example use of SVIR execution control means.

```
_Void Client(void *argument)
{
    // Insert the following four statements at the
```

TABLE 2-continued

Example use of SVIR execution control means.

```
beginning of
    // the block.
    set first thread = 0;
    declare semaphore;
    svir_execution_control(lock, semaphore, first_thread);
    if (!first_thread) svir_execution_control(wait,
semaphore, first_thread);
    SVIR instruction 1;
    SVIR instruction 2;
    ...
    SVIR instruction n;
    svir_execution_control(unlock, semaphore,
first_thread);
    // Multi-threaded execution resumes
    non-SVIR instruction;
    non-SVIR instruction;
    ...
}
```

TABLE 3

A C++ implementation of the example in table 2.

```
_Void Client(void *argument)
{
    // Insert the following four statements at the
    // beginning of the block.
    int first thread = 0;
    static HEV sem;
    static HEV dummy1 = ssvirlock, sem, first_thread);
    if (!first_thread) ssvir(wait, sem, first_thread);
    // Insert code including SVIR instructions here.
    *       *       *
    // Insert this statement right after the last static
    // variable definition.
    static HEV dummy2 = ssvir(unlock, sem, first_thread);

// Insert any other non-SVIR code here.
}
```

The control means and method of this component of the present invention can be initiated by a compiler or by application program code calls to a library routine. The principles described are equally applicable to either mode of operation. Accordingly, all such modifications and applications are intended to be included within the scope of the present invention as defined within the subjoined claims.

While the invention has bee particularly shown and described with reference to a preferred embodiments thereof, it will be understood by those skilled in the art that (various changes) (the foregoing and other changes) in form and details may be made therein without departing from the spirit and scope of the invention.

Having thus described our invention, what we claim as new and desire to secure by Letters Patent is:

1. A computer program product for enabling a processor in a computer system to control static variable operations including initialization and reference in a multi-threaded computer system having a central processing unit (CPU) and an operating system, said computer program product comprising:

a computer usable medium having computer readable program code means embodied in said medium for causing an application program to execute on the computer system, said computer readable program code means comprising a computer readable first program code means for causing the computer system to receive a lock request from a first thread, wherein said first thread is the first thread to request CPU processing of at least one static variable operation;

a computer readable second program code means for causing the computer system to switch said CPU to a single thread mode, wherein only said first thread is processed by said CPU during the single thread mode;

a computer readable third program code means for causing the computer system to label said first thread after said step of switching said CPU to a single thread mode; and a computer readable fourth program code means for causing the computer system to switch said CPU to multiple thread mode, wherein multiple threads are processed by said CPU during the multiple thread mode.

2. The computer program product of claim 1, wherein said computer readable third program code means for causing the computer system to label said first thread further comprises a computer readable fifth program code means for causing the computer system to initialize a semaphore, wherein said semaphore indicates said lock request has been granted.

3. The computer program product of claim 1, wherein said lock request is in response to a static variable initialization instruction.

4. The computer program product of claim 1, wherein said lock request is in response to a static variable reference instruction.

5. The computer program product of claim 1, further comprising a computer readable fifth program code means for causing the computer system to execute a static variable initialization instruction.

6. The computer program product of claim 1, further comprising a computer readable fifth program code means for causing the computer system to execute a static variable reference instruction.

* * * * *

UNITED STATES PATENT AND TRADEMARK OFFICE
CERTIFICATE OF CORRECTION

PATENT NO. : 5,852,731

DATED : December 22, 1998

INVENTOR(S) : Wang et al.

It is certified that error appears in the above-indentified patent and that said Letters Patent is hereby corrected as shown below:

On the cover page, in item [45], delete "Dec. 22, 1998" and insert --*Dec. 22, 1998-- in place thereof.

On the cover page, under item [73] and above item [21], please insert:

-- [*] Notice: The term of this patent shall not extend beyond the expiration date of Pat. No. 5,771,382.--

Signed and Sealed this

Second Day of November, 1999

Attest:

Q. TODD DICKINSON

Attesting Officer

Acting Commissioner of Patents and Trademarks